United States Patent [19]
Hirota

[11] Patent Number: 5,345,320
[45] Date of Patent: Sep. 6, 1994

[54] COLOR IMAGE DATA PROCESSING APPARATUS COMPRISING MONOCHROME PIXEL DETECTOR

[75] Inventor: Yoshihiko Hirota, Toyokawa, Japan

[73] Assignee: Minolta Camera Kabushiki Kaisha, Osaka, Japan

[21] Appl. No.: 797,932

[22] Filed: Nov. 26, 1991

[30] Foreign Application Priority Data

Nov. 29, 1990 [JP] Japan ................ 2-335843
Nov. 29, 1990 [JP] Japan ................ 2-335844

[51] Int. Cl.$^5$ .......................... H04N 1/46; G03F 3/08
[52] U.S. Cl. .................... 358/518; 358/520; 358/521
[58] Field of Search ................ 358/75, 80, 462, 465, 358/466, 518, 520, 521, 524, 501, 529

[56] References Cited

U.S. PATENT DOCUMENTS

| | | | |
|---|---|---|---|
| 4,623,917 | 11/1986 | Noguchi | 358/80 |
| 4,682,186 | 7/1987 | Sasaki et al. | 358/501 |
| 4,831,409 | 5/1989 | Tatara et al. | 358/524 |
| 4,908,712 | 3/1990 | Uchiyama et al. | 358/298 |
| 4,992,863 | 2/1991 | Moriya | 358/80 |
| 5,032,904 | 7/1991 | Murai et al. | 358/75 |

FOREIGN PATENT DOCUMENTS 61-13262 1/1986 Japan .

Primary Examiner—Edward L. Coles, Sr.
Assistant Examiner—Scott A. Rogers
Attorney, Agent, or Firm—Burns, Doane, Swecker & Mathis

[57] ABSTRACT

In a color image data processing apparatus for processing three color image data of three primary colors for representing a specified pixel, in response to one color image data preselected among the three color image data, a threshold data generator generates threshold data for representing upper and lower limits of respective ranges in which two color image data other than the preselected one color image data are to be present when the specified pixel is a monochrome pixel of white, black or half-tone black, and a monochrome pixel detector compares the other two color image data with the threshold data generated by the generation means, and judges that the specified pixel is the monochrome pixel when both of the other two color image data are respectively fallen in the respective ranges from the upper limit to the lower limit.

11 Claims, 11 Drawing Sheets

COLOR IMAGE DATA PROCESSING APPARATUS COMPRISING MONOCHROME PIXEL DETECTOR

BACKGROUND OF THE INVENTION

1. Field of the Invention

The present invention relates to a color image data processing apparatus, and more particularly, to a color image data processing apparatus comprising means for judging whether a pixel of a read image is a monochrome pixel or a color pixel other than the monochrome pixel which is provided in, for example, a digital full color copying machine. In the specification, a monochrome pixel of white, black or half-tone black having any half-tone density or gradation is referred to as a monochrome pixel hereinafter.

2. Description of the Related Art

In a conventional digital full color copying machine, a color image of an original is read every pixel by resolving the color image thereof into a red image (R), a green image (G) and a blue image (B) and converting them into respective digital image data of primary colors R, G and B, and then, the converted respective digital image data of three primary colors are subjected to color correction processes such as an under color removal process, a black adding process and a masking process or the like.

Thereafter, based on respective digital image data of cyan (C), magenta (M), yellow (Y) and black (K) which are obtained by the above-mentioned color correction processes, a cyan image, a magenta image, a yellow image and a black image are sequentially reproduced, and then, digital dot images thereof are transferred onto a sheet of copying paper, resulting in a reproduced full color image.

As one of the conventional digital full color copying machines of this type, there is known a copying machine which has a circuit for performing a color conversion process for converting a specified portion of a read color image into an image of a preferred color, for example, converting a blue image of the read color image into a red image thereof. In order to perform the above-mentioned color conversion process, there is provided a color judgement circuit for judging whether or not each pixel of the read image is a blue pixel as specified. The conventional color judgement circuit employs a table reference system using a memory which is constituted by a ROM having tables of a number equal to the kinds of specified colors, namely, four tables in the case of 4 specified colors of blue, red, yellow and black.

To address data terminals of the ROM of the color judgement circuit, there are inputted two bits selection data for selecting one of the four tables and (8×3) bits digital image data of three respective colors R, G and B outputted from the CCD image sensor. In this case, the ROM selects one table of the 4 tables based on the inputted selection data, and then, judges whether or not each pixel of the read color image is a pixel of the specified color based on respective inputted digital image data of three colors, thereby outputting one bit judgement result signal for indicating the judgement result.

However, since respective (8×3) bits digital image data for three colors R, G and B outputted from the CCD image sensor are inputted to the color judgement circuit as address data for the judgment, there is caused such problems that a memory capacity of the ROM becomes relatively large and a processing speed of the color judgement circuit is relatively low.

SUMMARY OF THE INVENTION

An essential object of the present invention is therefore to provide a color image data processing apparatus capable of judging whether or not each pixel of a color image is a monochrome pixel in a higher speed which is constituted by a circuit simpler than that of the conventional apparatus.

Another object of the present invention is to provide a method for processing color image data capable of judging whether or not each pixel of a color image is a monochrome pixel in a higher speed which is constituted by processes circuit simpler than that of the conventional method.

A further object of the present invention is to provide a color image data processing apparatus and a method for processing color image data, capable of improving a reproductivity of a saturation of a color image and a black image of a monochrome image.

A still further object of the present invention is to provide a color image data processing apparatus and a method for processing color image data, capable of judging whether or not each pixel of a color image is a monochrome pixel, and determining an under color removal amount and a black adding amount based on a judgement result of each pixel.

In order to achieve the aforementioned objective, according to one aspect of the present invention, there is provided a color image data processing apparatus for processing three color image data of three primary colors for representing a specified pixel, comprising:

generation means in response to one color image data preselected among said three color image data for generating threshold data for representing upper and lower limits of respective ranges in which two color image data other than said preselected one color image data are to be present when said specified pixel is a monochrome pixel of white, black or half-tone black; and judgement means for comparing said other two color image data with said threshold data generated by said generation means, and judging that said specified pixel is said monochrome pixel when both of said other two color image data are respectively fallen in said respective ranges from said upper limit to said lower limit.

According to another aspect of the present invention, there is provided a color image data processing apparatus for converting color image data of red, green and blue of a specified pixel into color image data of cyan, magenta, yellow and black, comprising:

judgement means in response to said color image data of red, green and blue for judging whether or not said specified pixel is a monochrome pixel of white, black or half-tone black; and conversion means in response to a judgement result of said judgement means for determining an under color removal amount and a black adding amount and converting said color image data of red, green and blue of said specified pixel into color image data of cyan, magenta, yellow and black with said determined under color removal amount and said determined black adding amount,

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIGS., 1a and 1b are schematic block diagrams showing a color image processing section and a print head section of a digital full color copying machine of a preferred embodiment according to the present invention;

FIG. 4b is an enlarged schematic plan view showing a portion of the contact type CCD image sensor shown in FIG. 4a;

FIG. 6 is a schematic block diagram showing a shading correction circuit shogun in FIG. 1a;

FIG. 7 is a schematic block diagram showing a monochrome pixel detector shown in FIG. 1a;

FIG. 8 is a schematic block diagram showing a color correction circuit shown in FIG. 1a;

DETAILED DESCRIPTION OF THE PREFERRED EMBODIMENT

A digital full color copying machine of a preferred embodiment according to the present invention will be described below with reference to the attached drawings.

The features of the digital full color copying machine according to the present embodiment are as follows. A color image of an original is read by resolving the color image into images of three primary colors of red (R), green (G) and blue (B) every pixel and converting the read images of three primary colors into respective digital image data for showing densities of three primary colors of R, G and B. Thereafter, there is performed a color correction process which is different depending on a judgement result of judging whether or not each pixel of the read image is a monochrome pixel, for respective converted digital image data of three primary colors. Based on respective digital image data of four colors of cyan (C), magenta (M), yellow (Y) and black (K) which the above-mentioned color correction process has been performed, a cyan image, a magenta image, a yellow image and a black image are reproduced in this order every one scan of the color image, and then, digital dot images thereof are transferred onto a sheet of copying paper plural times, resulting in a reproduced full color image. In the above-mentioned color correction process, based on respective converted digital image data of three primary colors R, G and B, digital image data of black K is generated, and also, there are generated an upper threshold data GH of an upper limit and a lower threshold data GL of a lower limit which are used for judging whether or not each pixel of the read image based on the digital image data of green color G. Then, the digital image data of the other two colors R and B are compared with the upper and lower threshold image data GH and GL, thereby judging whether or not each pixel of the read image is a monochrome pixel of white, black or half-tone black having any half-tone density or gradation. Finally, processing methods of an under color removal process and a black adding process are altered according to the judgement result.

Figure 1A:
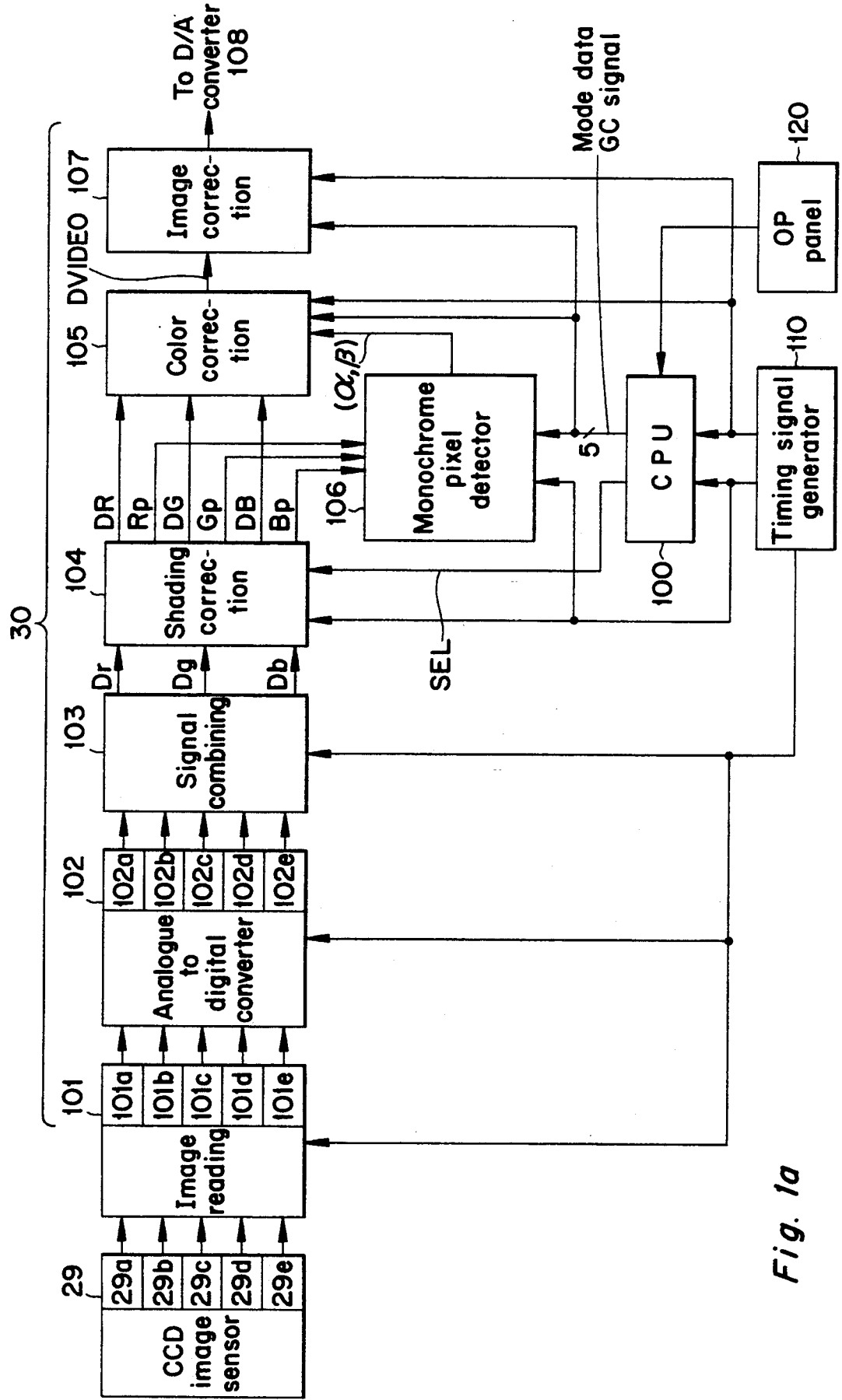
Figure 1B:
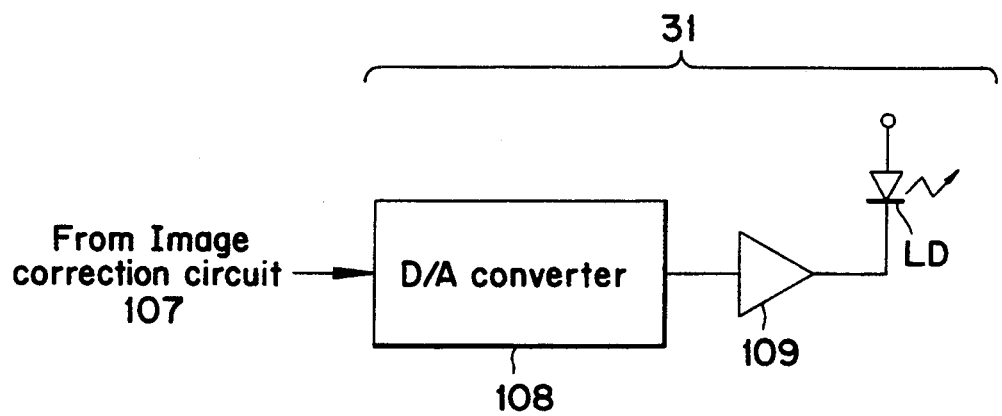
Figure 2:
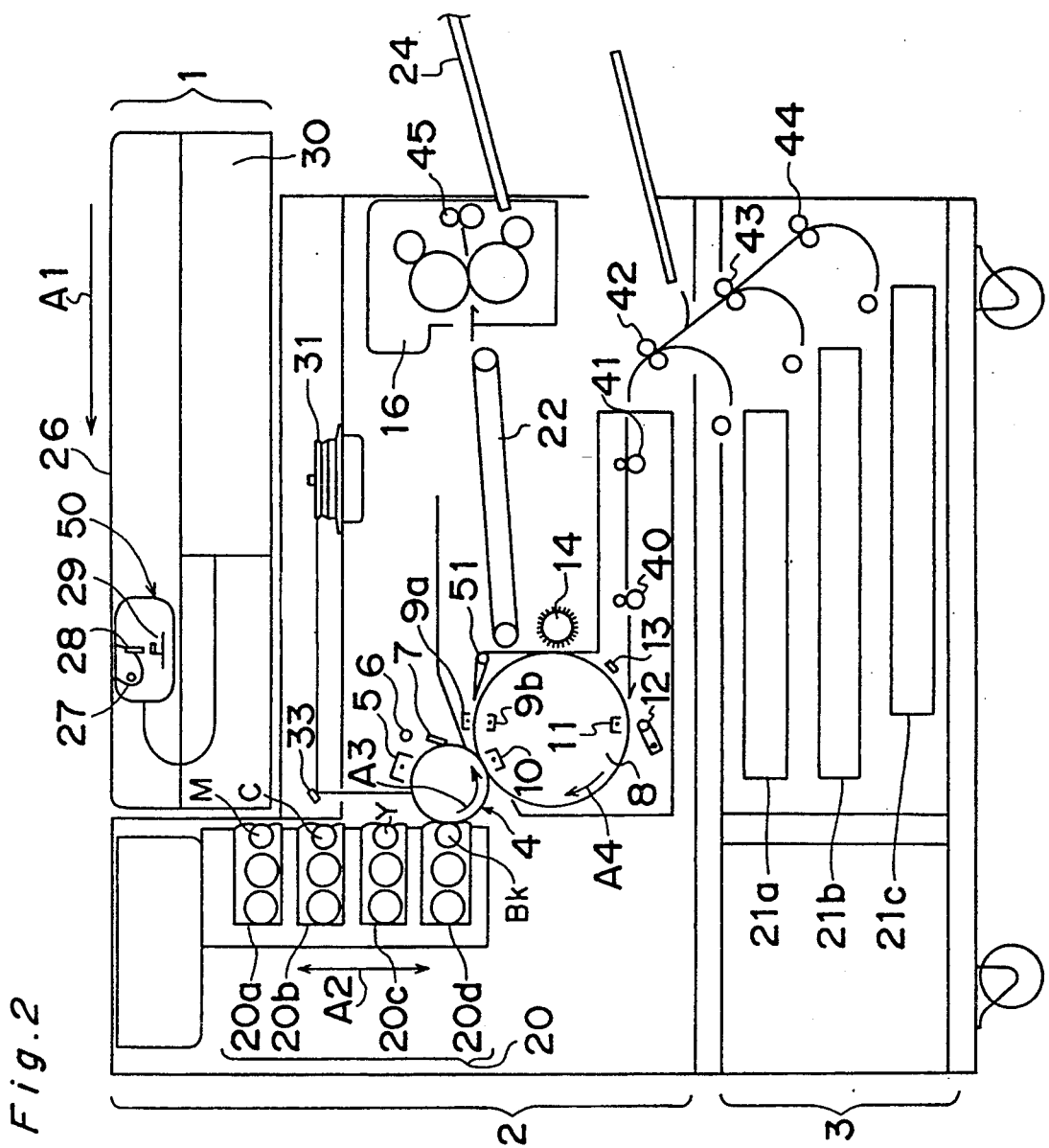
FIG. 2 is a schematic longitudinal cross sectional view showing a mechanical section of the digital full color copying machine shown in FIGS. 1a and 1b.

FIG. 2 shows a mechanical section of the digital full color copying machine shown in FIGS. 1a and 1 b.

Referring to FIG. 2, the digital full color copying machine includes a color image reading section 1 provided in an upper portion thereof, a full color printer section 2 provided in an intermediate portion thereof and a paper feeder section 3 provided in a lower portion thereof. After the color image reading section 1 reads a color image of an original placed on an original table glass 26 by resolving the color image thereof into images of three colors of red (R), green (G) and blue (B) using a contact type CCD image sensor 29, it converts them into respective digital image signals of three colors. The full color printer 2 is a laser full color printer using an electrophotographic process, and in accordance with the converted digital image signals, it reproduces images of cyan (C), magenta (M), yellow (y) and black (K) in this order every one scan of the color image, and transfers digital dot images thereof onto a sheet of copying paper fed from the paper feeder section 3 plural times, resulting in a printed full color image. The digital full color copying machine has also a mono color mode for forming one of respective monochromatic images of seven colors, C, M, Y, K, R, G and B.

In the first place, the image reading section 1 will be described below.

Referring to FIG. 2, an original scanning device 50 comprises an exposure lamp 27 for irradiating an original, a rod lens array 28 for condensing a reflected light from the original, and the contact type CCD image sensor 29 for converting the condensed reflected light into respective analogue electric image signals of R, G and B. Upon reading a color image of the original, the original scanning device 50 scans the original placed on the original table glass 26 in a subscan direction indicated by an arrow A1, and then, the color image of the original irradiated by the exposure lamp 27 is converted into analogue electric image signals of R, G and B in a predetermined photoelectric conversion process by the contact type CCD image sensor 29. The respective analogue electric image signals of R, G and B outputted from the contact type CCD image sensor 29 are converted into respective ones of printer driving digital signals of C, M, Y and K by an image processing section 30 in a manner as described in detail later, and thereafter, the printer driving digital signals are outputted to a print head section 31 of the full color printer section 2.

Subsequently, the full color printer section 2 will be described.

Referring to FIG. 1b, the print head section 31 comprises a digital to analogue converter (referred to as a D/A converter hereinafter) 108 for converting the printer driving digital signal outputted from the image processing section 30 into an analogue signal, an amplifier 109 for amplifying the D/A converted printer driving signal, the laser diode LD for emitting a laser light in accordance with the printer driving signal, a polygon mirror (not shown) for scanning the laser light emitted from the laser diode LD in a main scan direction, a motor (not shown) for rotating the polygon mirror, and a fθ lens (not shown) for focusing an image of the scanned light emitted from the polygon mirror onto a photoconductive drum 4 through a reflection mirror 33.

The laser light emitted from the laser diode LD of the print head section 31 in accordance with the printer driving signal is scanned in the main scan direction by the polygon mirror, and subsequently reflected by the reflection mirror 33 so as to arrive at the photoconductive drum 4, thereby forming an electrostatic latent image corresponding to the image of the original on the photoconductive drum 4. Around the photoconductive drum 4, there are provided a corona charger 5 for electrifying a surface of the photoconductive drum 4 uniformly with a predetermined polarity, an eraser lamp 6 for discharging electrons on the surface of the photoconductive drum 4, a developing unit 20 for developing the electrostatic latent image formed on the photoconductive drum 4 by exposure of the laser light with toner, and a toner blade 7 for collecting the remaining toner not transferred from the photoconductive drum 4 onto a transfer drum 8. The developing unit 20 comprises developing devices 20a, 20b, 20c and 20d respectively provided with toners of magenta, cyan, yellow and black, which are constructed so as to be movable in up and down directions as indicated by an arrow A2 in FIG. 2. For example, when a toner image of cyan is to be formed on the photoconductive drum 4, the cyan developing device 20b is moved so as to contact the photoconductive drum 4, and then, a developing operation is performed using cyan toner. Similarly, respective development operations using magenta, yellow and black toners are performed by moving the developing devices 20a, 20c and 20d so as to contact the photoconductive drum 4, respectively.

Below the photoconductive drum 4, there is provided the transfer drum 8 for transferring a toner image formed on the photoconductive drum 4 thereonto so as to contact the photoconductive drum 4. Around the transfer drum 8, there are provided dischargers 9a and 9b for discharging the surface of the transfer drum 8, a transfer charger 10 for transferring a toner image formed on the photoconductive drum 4 onto the transfer drum 8, an absorption charger 11 for electrostatically absorbing a sheet of copying paper onto the transfer drum 8, a pressing roller 12 for pressing a sheet of copying paper onto the transfer drum 8 upon electrostatically absorbing it, a reference position sensor 13 for detecting a predetermined reference position of the transfer drum 8, a fur rush 14 for collecting toner of the toner image on the transfer drum 8 which has not transferred onto a sheet of copying paper, and a separation nail 51 for separating a sheet of copying paper from the transfer drum 8. It is to be noted that the photoconductive drum 4 and the transfer drum 8 are rotated in synchronization with each other in the directions as indicated by arrows A3 and A4, respectively, as shown in FIG. 2.

Furthermore, the paper feeder section 3 comprises three paper feeding trays 21a, 21b and 21c. A sheet of copying paper fed from one paper feeding tray selected among the sheet feeder trays 21a, 21b and 21c is transferred by transfer rollers 44, 43, 42, 41 and 40, and then, the end thereof is chucked onto the transfer drum 8 so that the copying paper is electrostatically absorbed so as to be stuck onto the transfer drum 8 by the absorption charger 11 and the pressing roller 12. After the toner image formed on the transfer drum 8 is transferred onto the copying paper in a manner known to those skilled in the art, the copying paper is separated by the separation nail 51, and then, is transmitted to an image fixing unit 16 by a transfer belt 22. The copying paper after completion of fixing the toner image is discharged onto a paper discharge tray 24 by a paper discharge roller 45.

Figure 3:
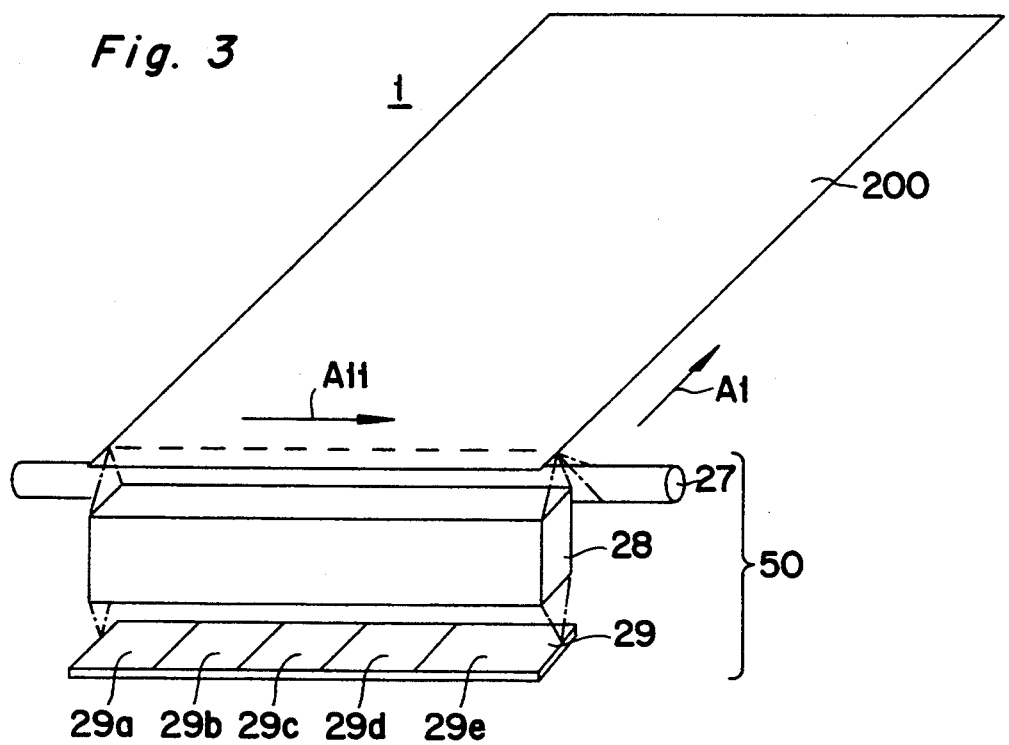
FIG. 3 is a schematic perspective view showing a color image reading section of the digital full color copying machine shown in FIGS. 1a and 1b.

FIG. 3 shows the color image reading section 1 of the digital full color copying machine in FIGS. 1a and 1b.

As shown in FIG. 3, an original 200 having an image to be copied is irradiated by the exposure lamp 27 having spectral distributions of three colors R, G and B, and a reflected light from the original 200 is incident in a form of a line onto a receiving surface of the contact type CCD image sensor 29 through the rod lens array 28, and then, the image of the original 200 is formed thereon at an equal magnification rate. The original scanning device 50 comprising the exposure lamp 27, the rod lens array 28 and the contact type CCD image sensor 29 is scanned in the subscan direction as indicated by the arrow A1, and then, the image of the original 200 is converted into electric image signals of three colors by the CCD image sensor 29 in a known photoelectric conversion process.

Figure 4A:
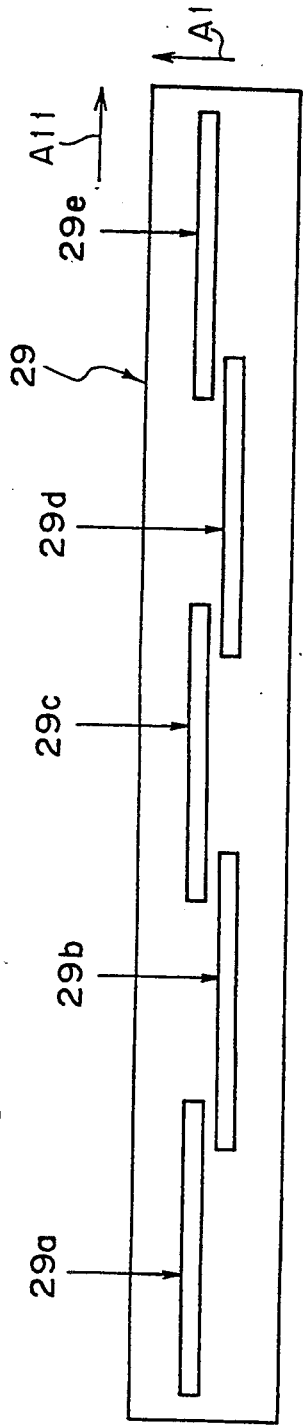
FIG. 4a is a schematic plan view showing a contact type CCD image sensor shown in FIG. 3.
Figure 4B:
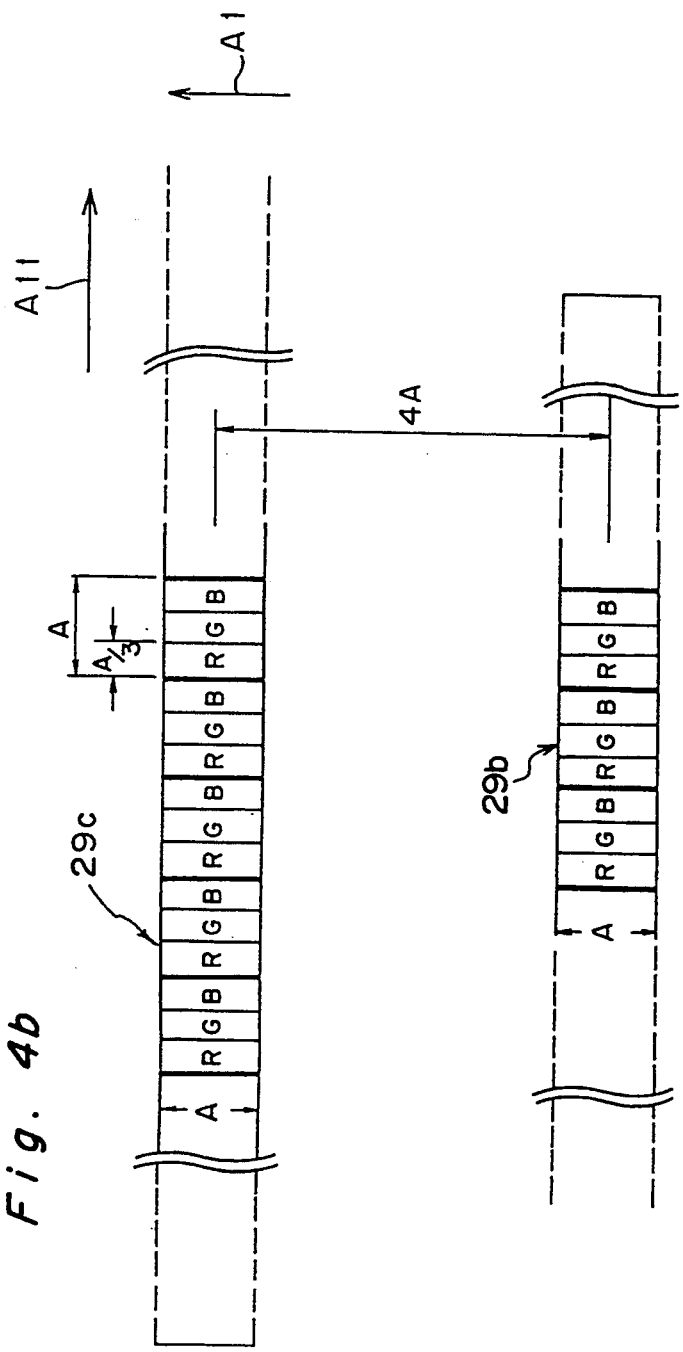
Figure 5:
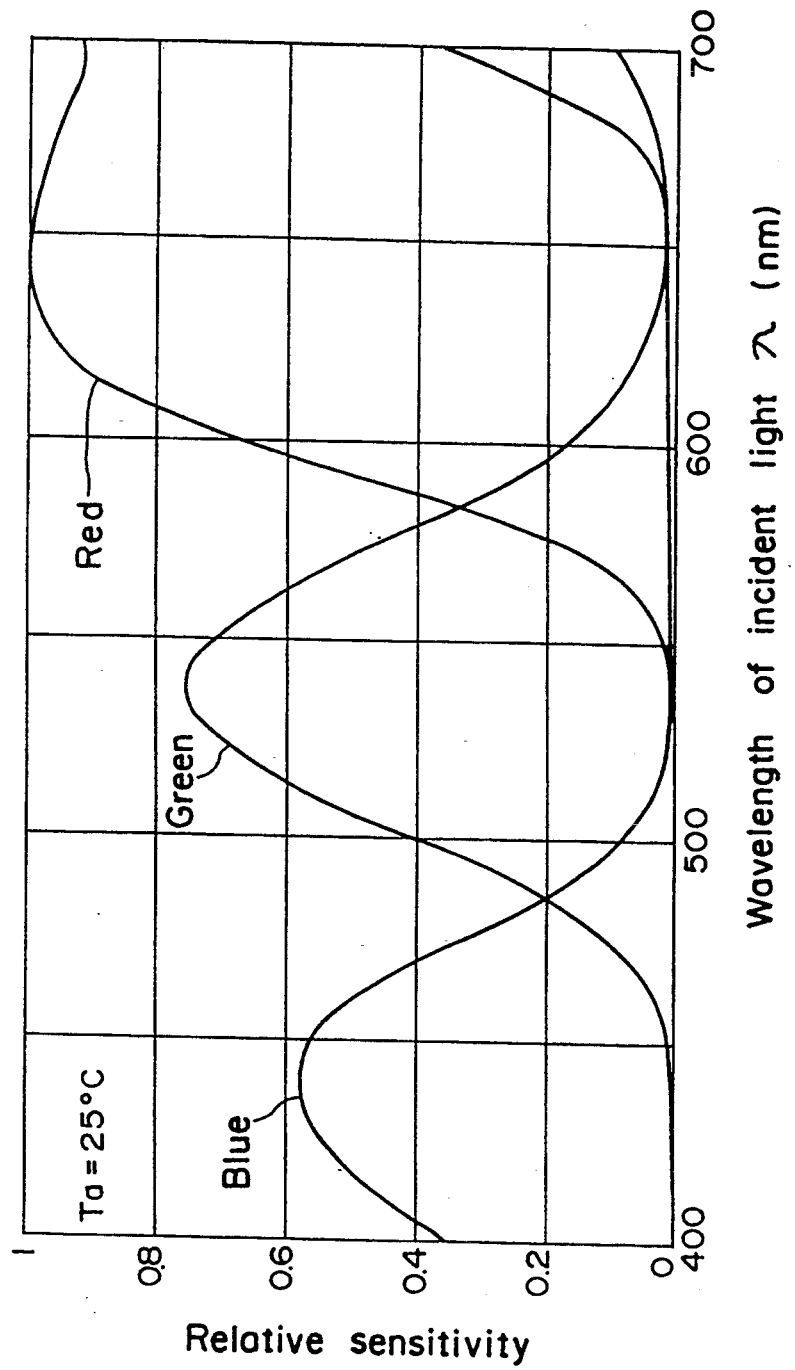
FIG. 5 is a graph showing wavelength characteristics of optical filters of red, green and blue provided in the contact type CCD image sensor shown in FIGS. 4a and 4b.

As shown in FIG. 4a, the CCD image sensor 29 is so constructed that five CCD image sensor chips 29a to 29e are arranged in a zigzag shape such as a form of a footprint formed when a bird walks so as to be arranged in a pitch in the main scan direction equal to a length of four pixels in the subscan direction. Each of the chips 29a to 29e has effective image reading pixels of 2880 dots so as to read an A3 size original at a resolution of 400 dpi. Furthermore, each pixel of the chips 29a to 29e is divided into three parts as shown in FIG. 4b in the main scan direction and comprises optical filters for passing light having wavelengths of three colors R, G and B respectively. FIG. 5 shows wavelength characteristics of the optical filters of three colors R, G and B of the CCD image sensor 29.

FIGS. 1a and 1b shows the color image processing section 30 and the print head section 31.

Referring to FIG. 1a, an image reading circuit 101 of the color image processing section 30 has chips 101a to 101e corresponding to respective chips 29a to 29e of the CCD image sensor 29. After effecting respective processes such as a noise removal process and a signal amplification process for the respective electric image signals of R, G and B outputted from respective chips 29a to 29e of the CCD image sensor 29, the image reading circuit 101 outputs the electric image signals after completion of the above-mentioned processes to an analogue to digital converter (referred to as an A/D converter hereinafter) 102. The A/D converter 102 has five chips 102a to 102e corresponding to respective chips 101a to 101e of the image reading circuit 101. The A/D converter 102 converts the respective electric image signals of R, G and B outputted from the respective chips 101a to 101e of the image reading circuit 101 into digital image signals, and outputs them to a signal combining circuit 103. The signal combining circuit 103 performs processes such as a color separation process and a process for correcting a shift between the signals etc. for the digital image signals outputted from the respective chips 102a to 102e of the A/D converter 102, combines them so as to obtain digital image data Dr, Dg and Db for representing densities of three colors R, G and B, and outputs them to a shading correction circuit 104.

The shading correction circuit 104 performs a shading correction process including a black level compensation process, a shading distortion correction process and a reflectivity to density conversion process which are known to those skilled in the art for the digital image data Dr, Dg and Db, outputs image data Rp, Gp and Bp of three colors R, G and B prior to the reflectivity to density conversion process to a monochrome pixel detector 106, and outputs image data DR, DG and DB of three colors R, G and B after completion of the reflectivity to density conversion process to a color correction circuit 105. The shading correction circuit 104 has the following eight kinds of density conversion tables for the reflectivity to density conversion process which are respectively stored in ROMs 314, 315 and 316 for three colors R, G and B, wherein one kind of density conversion table is selectively used among them in accordance with a table selection data SEL inputted from a CPU 100:

(a) a density conversion table for checking CCD image data (in the case of SEL=0);
(b) a density conversion table for reading a half-tone image (in the case of SEL=1);
(c) a density conversion table for reading characters and a fine line (in the case of SEL=2); and
(d) five kinds of density conversion tables for reading a film original (in the case of SEL=3, 4, 5, 6 or 7).

The monochrome pixel detector 106 detects whether each pixel of the read image is a monochrome pixel or a color pixel other than the monochrome pixel based on the image data Rp, Gp and Bp inputted from the shading correction circuit 104 in a manner described in detail later, generates UCR/BP coefficient data ($\alpha$, $\beta$) required for the under color removal process and the black adding process which are performed in the color correction circuit 105, based on the a detection result of the monochrome pixel, mode data of three bits for representing an operation mode and a generation color, and a generation color signal (referred to as a GC signal in FIGS.) of two bits for representing a generation color which are inputted from the CPU 100, and then, outputs the generated UCR/BP coefficient data ($\alpha$, $\beta$) to the color correction circuit 105.

As described in detail later, in the full color mode, the color correction circuit 105 performs the under color removal process and the black adding process for the image data DR, DG and DB inputted from the shading correction circuit 104 based on the UCR/BP coefficient data ($\alpha$, $\beta$) inputted from the monochrome pixel detector 106, and then, performs the masking process for them based on masking coefficient data $C_1$=Ac, Bc or Cc, $C_2$=Am, Bm or Cm and $C_3$=Ay, By or Cy generated in accordance with the mode data inputted from the CPU 100, thereby generating image data C, M and Y of cyan, magenta and yellow and outputting them as digital image data DVIDEO to the image correction circuit 107. On the other hand, the color correction circuit 105 generates monochromatic image data MC based on the masking coefficient data $C_1$=Ecx, $C_2$=Emx and $C_3$=Eyx (x=c, m, y, r, g, b) generated in accordance with the mode data inputted from the CPU 100, and outputting the generated monochromatic image data or mono color data MC as the digital image data DVIDEO to the image correction circuit 107.

Subsequently, the image correction circuit 107 performs an MTF process including a $\gamma$ correction process, a smoothing process and an edge emphasizing process, etc. which are known to those skilled in the art for the digital image data DVIDEO inputted from the color correction circuit 105, and then, outputs image data after completion of the MTF process as a printer driving digital signal through the D/A converter 108 and the amplifier 109 to the laser diode LD. At that time, the laser diode LD is driven in accordance with the digital printer driving signal so as to emit light, thereby forming a color image or a monochromatic image on a sheet of copying paper using the electrophotographic process as described above.

A timing signal generator 110 outputs a synchronizing signal and timing signals for the above-mentioned respective processes to the CPU 100 and respective circuits 101 to 107 of the color image processing section 30. An operation panel 120 comprises a start key (not shown) for starting a copying operation, an operation mode selection key (not shown) for selecting either the full color mode or the mono color mode, and a table selection key (not shown) for selecting one of the eight kinds of density conversion tables provided in the shading correction circuit 104. Information of the key selection selected using the respective keys is outputted from the operation panel 120 to the CPU 100. Based on the synchronizing signal and the timing signals outputted from the timing signal generator 110 and the information of the key selection outputted from the operation panel 120, the CPU 100 outputs the mode data of three bits and the generation color signal of two bits as shown in Table 1 to the monochrome pixel detector 106, the color correction circuit 105 and the image correction circuit 107, and also outputs the table selection data SEL to the shading correction circuit 104.

In the above-mentioned color image processing section 30, image data or image signals are processed every pixel in the subscan direction in the respective circuits from the image reading circuit 101 to the input terminals of the color correction circuit 105 and the monochrome pixel detector 106. Further, in the full color mode, image data are processed in the color correction circuit 105 and the monochrome pixel detector 106 every pixel in an order of a cyan image, a magenta image, an yellow image and a black image. On the other hand, in the mono color mode, image data are processed in the color correction circuit 105 and the monochrome pixel detector 106 every pixel of the monochromatic image or the one color image.

Figure 6:
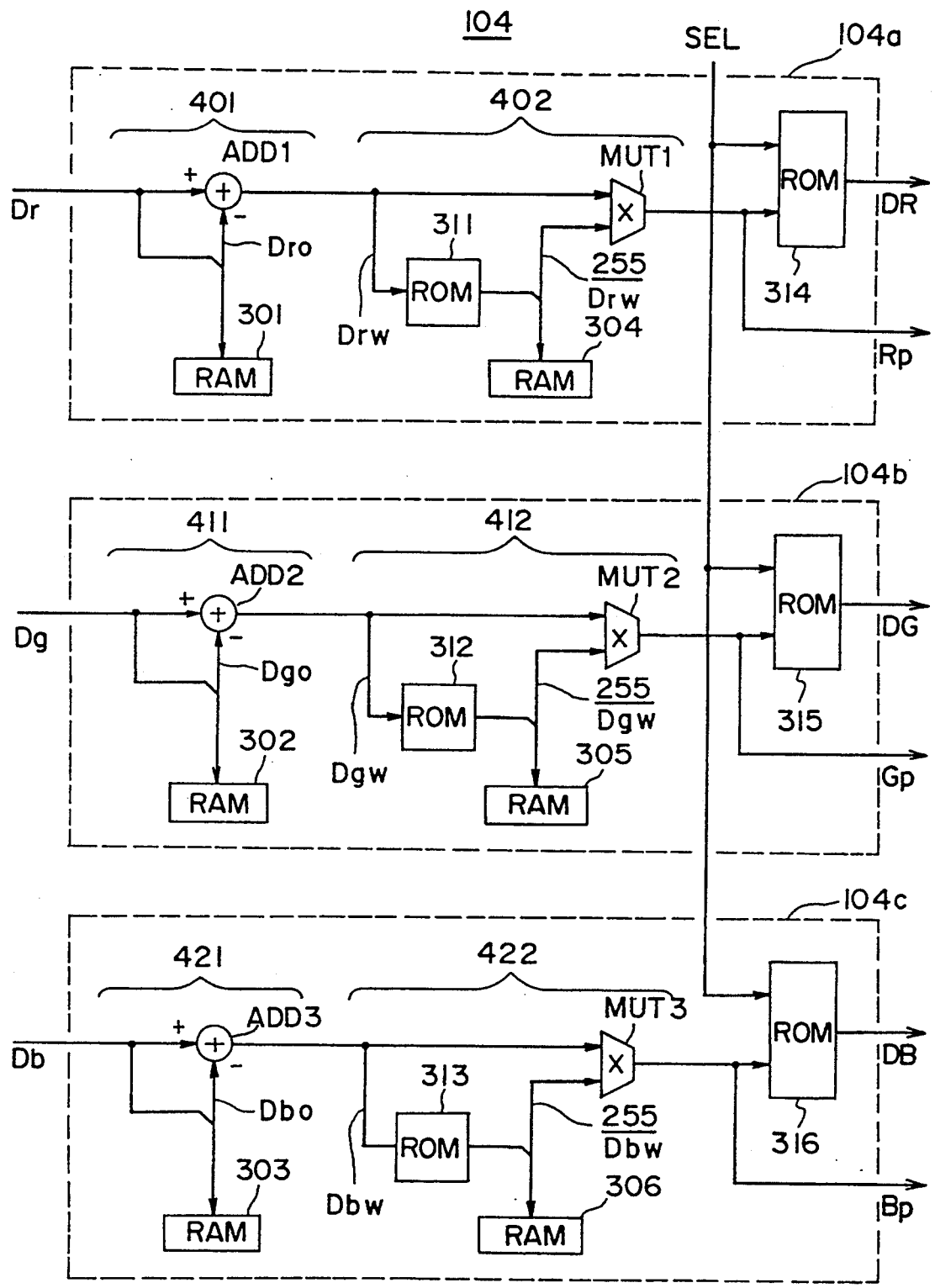

FIG. 6 shows the shading correction circuit 104 shown in FIG. 1a.

The shading compensation circuit 104 comprises correction circuits 104a, 104b and 104c for respective colors of R, G and B.

The correction circuit 104a for processing the image data Dr of red comprises:

(a) a black level correction circuit 401 composed of an adder ADD1 and a RAM 301, which suppresses a change in the black level caused due to a DC voltage characteristic of the CCD image sensor 29 and a temperature characteristic of a dark voltage thereof;

(b) a shading distortion correction circuit 402 composed of a ROM 311 for storing data obtained by multiplying a reciprocal of the address by 255, a RAM 304 for temporarily storing data outputted from the ROM 311, and a multiplier MUT1 for multiplying data outputted from the adder ADD1 by data outputted from the RAM 304, which removes an ununiformity of the sensitivity of the CCD image sensor 29 and also removes an ununiformity of a light amount upon reading an image in the main scan direction caused due to the spectral distributions of the optical system such as the exposure lamp 27; and (c) a ROM 314 for storing the above-mentioned eight kinds of density conversion tables.

In the black level correction circuit 401, when the incident light onto the CCD image sensor 29 is zero, red image data $Dr_o$ inputted from the signal combining circuit 103 are inputted to the RAM 301 and are stored therein, and further, upon reading an original image, the image data Dr are inputted to the adder ADD1. The adder ADD1 subtracts the image data $Dr_o$ when the incident light is zero from the image data Dr upon reading the original image, and outputs image data of the subtraction result to the shading distortion correction circuit 402. It is to be noted that there is further performed an offset correction process for digital processing of image data in the black level correction circuit 401.

In the shading distortion correction circuit 402, image data Drw outputted from the adder ADD1 when a shading reference white plate is placed on the original table glass in stead of the original are inputted to the reciprocal table ROM 211 as address data. In response to the image data Drw, the ROM 311 multiplies the reciprocal data 1/Drw of the image data Drw inputted as address data by 255 using the incorporated reciprocal table, and then outputs the multiplication result data 255/Drw to the RAM 304 so as to be stored therein. Upon reading the original image, image data outputted from the adder ADD1 are inputted to the multiplier MUT1 and are multiplied by the data 255/Drw read out from the RAM 304, and the data of the multiplication result are outputted to address terminals of the ROM 314 as address data of the lower eight bits, and also outputted as image data Rp to the monochrome pixel detector 106. It is to be noted that there is further performed a white balance correction process in the above-mentioned shading distortion correction circuit 402.

The image data Rp outputted from the shading distortion correction circuit 402 are represented by the following equation:

$$Rp = (Dr - Dr_o) \cdot 255 / Drw \qquad (1).$$

The ROM 314 comprising the density conversion tables is provided for performing a reflectivity to density conversion process so that a characteristic of the electric image signal outputted from the CCD image sensor 29 to a visual density of an original image or a so-called image reading characteristic becomes linear. Namely, the ROM 314 performs the reflectivity to density conversion process for the image data Rp inputted as the address data of the lower eight bits using one kind of density conversion table selected by the table selection data SEL inputted as the address data of the upper three bits, and outputs image data DR after completion of the reflectivity-to density conversion process to the color correction circuit 105.

The correction circuit 104b for processing the image data Dg of green comprises:

(a) a black level correction circuit 411 composed of an adder ADD2 and a RAM 302;

(b) a shading distortion correction circuit 412 composed of a ROM 312, a RAM 305 and a multiplier MUT2; and (c) a ROM 315 for storing the density conversion tables, and is constituted in a manner similar to that of the correction circuit 104a and operates similarly. Image data Gp outputted from the shading distortion correction circuit 412 are represented by the following equation:

$$Gp = (Dg - Dg_o) \cdot 255 / Dgw \qquad (2)$$

where $Dg_o$ is image data Dg of green when the incident light is zero, and Dgw is image data outputted from the adder ADD2 when the shading reference white plate is placed on the original table glass 26 in stead of the original.

The image data Gp outputted from the multiplier MUT2 of the shading distortion correction circuit 412 are inputted to the ROM 315 as address data of the lower eight bits, and also outputted to the monochrome pixel detector 106. The ROM 315 performs the reflectivity to density conversion process for the image data Gp inputted as the address data of the lower eight bits using one kind of density conversion table selected by the table selection data SEL inputted as the address data of the upper three bits, and outputs image data DG after completion of the reflectivity to density conversion process to the color correction circuit 105.

The correction circuit 104c for processing the image data Dg of blue comprises:

(a) a black level correction circuit 421 composed of an adder ADD3 and a RAM 303;

(b) a shading distortion correction circuit 422 composed of a ROM 313, a RAM 306 and a multiplier MUT3; and (c) a ROM 316 for storing the density conversion tables, and is constituted in a manner similar to those of the correction circuits 104a and 104b and operates similarly. Image data Bp outputted from the shading distortion correction circuit 422 are represented by the following equation:

$$Bp = (Db - Db_o) \cdot 255 / Dbw \qquad (3)$$

where $Db_o$ is image data Db of blue color when the incident light is zero, and Dbw is image data outputted from the adder ADD3 when the shading reference white plate is placed on the original table glass 26 instead of the original.

The image data Bp outputted from the multiplier MUT3 of the shading distortion correction circuit 422 are inputted to the ROM 316 as address data of the lower 8 bits, and also outputted to the monochrome pixel detector 106. The ROM 316 performs the reflectivity to density conversion process for the image data Bp inputted as the address data of the lower eight bits using one kind of density conversion table selected by the table selection data SEL inputted as the address data of the upper three bits, and outputs image data DB after completion of the reflectivity to density conversion process to the color correction circuit 105.

Figure 9:
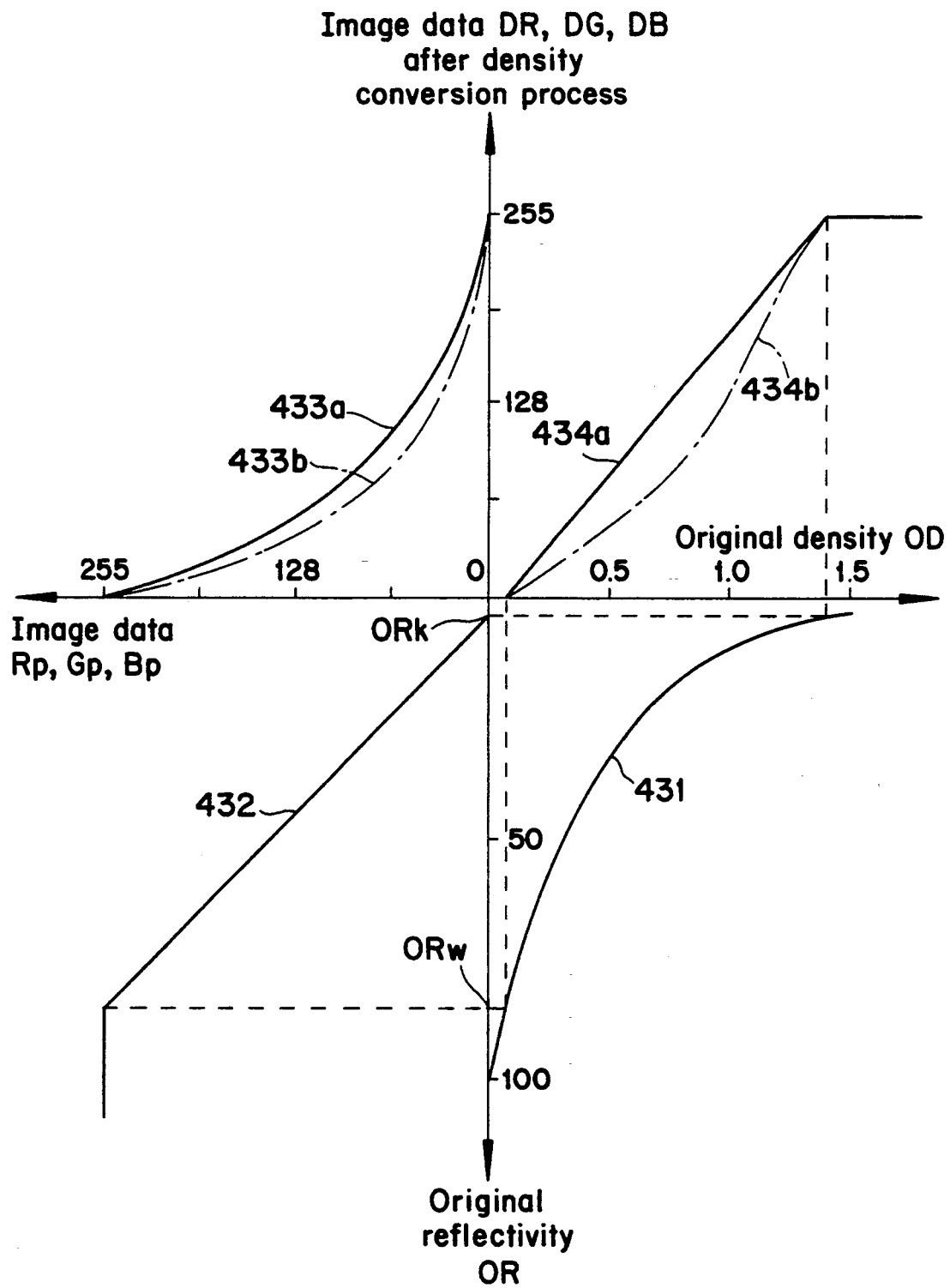
FIG. 9 is a graph showing an original reflectivity to original density characteristic, a photoelectric characteristic, a density conversion characteristic and an image reading characteristic of the digital full color copying machine shown in FIGS. 1a and 1b.

FIG. 9 is a graph showing an original reflectivity to original density characteristic, a photoelectric conversion characteristic, a density conversion characteristic and an image reading characteristic of the digital full color copying machine shown in FIGS. 1a and 1b. In FIG. 9, real curves show respective characteristics upon reading characters and a fine line (SEL=2), and alternate long and short dash curves show respective characteristics upon reading a half-tone image (SEL=1).

Referring to FIG. 9, a characteristic curve 431 is a characteristic curve called a so-called -log curve, in which human eyes can see a density of an original approximately linearly. In this case, a relationship between an original density OD and an intensity of the reflected light from the original when a light having a predetermined light amount is irradiated onto the original or an original reflectivity OR is represented by the following equation:

$$OD = -\log(OR) \qquad (4)$$

Meanwhile, a characteristic curve 432 is the photoelectric conversion characteristic of the CCD image sensor 29. Since the CCD image sensor 29 generally outputs an electric image signal proportional to the intensity of the light incident onto the receiving surface of the CCD image sensor 29 in a range of the original reflectivity OR from an original reflectivity ORw of the shading reference white plate used as the reference of white instead of the original to a reflectivity ORk of the black level which is a detection limit of the CCD image sensor 29, the photoelectric conversion characteristic 432 for representing a relationship between the image data Rp, Gp and Bp and the original reflectivity OR is linear. In the present preferred embodiment, the electric image signal outputted from the CCD image sensor 29 is A/D converted into digital image data of 256 gradations, namely, the original density OD is represented by the eight bits image data.

Furthermore, characteristic curves 433a and 433b are characteristics of the density conversion tables. Since the CCD image sensor 29 generally has a linear output characteristic not to the original density OD but to the original reflectivity OR, the above-mentioned reflectivity to density conversion process is performed in the shading correction circuit 104 in order to obtain image data linear to the original density OD.

Furthermore, characteristic curves 434a and 434b are image reading characteristics for showing a relationship between the original density OD and the image data DR, DG and DB obtained by correcting the electric image signal outputted from the CCD image sensor 29 using the above-mentioned density conversion table. Although these characteristics are preferably linear generally, taking the output characteristic of the printer section 2 into consideration, they may be set to be predetermined non-linear characteristics in the case of printing a half-tone image.

Meanwhile, when the UCR/BP coefficient data $\alpha$ and $\beta$ used in the under color removal process and the black adding process of the color correction circuit 105 are closer to $-100\%$ or $100\%$, the quality of the reproduced black image is improved.

However, when the UCR/BP coefficient data $\alpha$ and $\beta$ are too large, there is such a problem that a clearness of color such as poster colors is lowered so that a color patch image or a skin color image in a photograph original becomes dark. In order to solve this problem, whether each pixel of the read image is a monochrome pixel or a color pixel other than the monochrome pixel is detected by the monochrome pixel detector 106, then, and the UCR/BP coefficient data $\alpha$ and $\beta$ previously determined based on the detection result are outputted to the color correction circuit 105.

Figure 7:
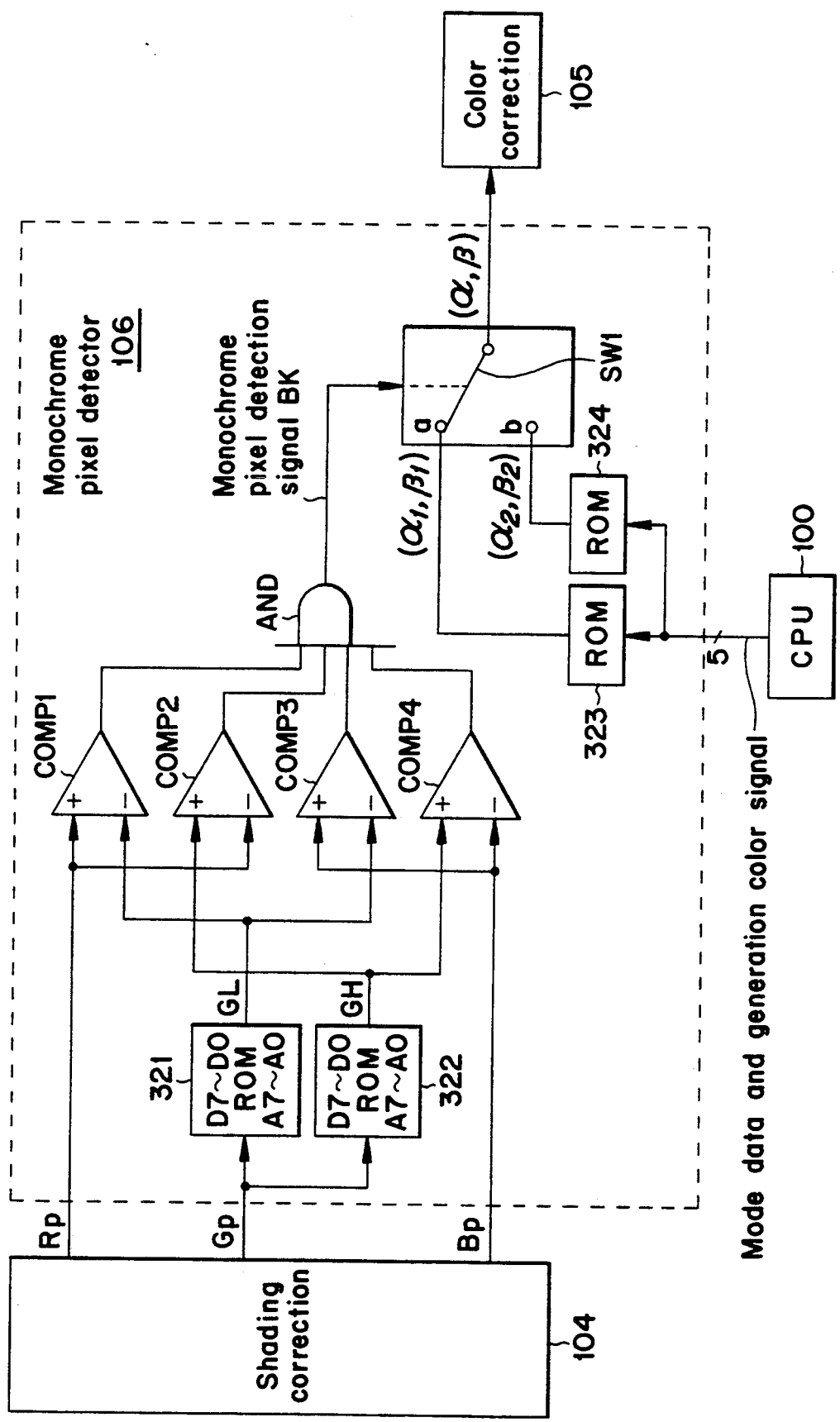

FIG. 7 shows the monochrome pixel detector 106 shown in FIG. 1a.

Basically, image data Rp, Gp and Bp of a monochrome pixel have relationships represented by the following equations (5a) and (5b).

$$Gp \approx Rp \qquad (5a)$$

$$Gp = Bp \qquad (5b)$$

Figure 10:
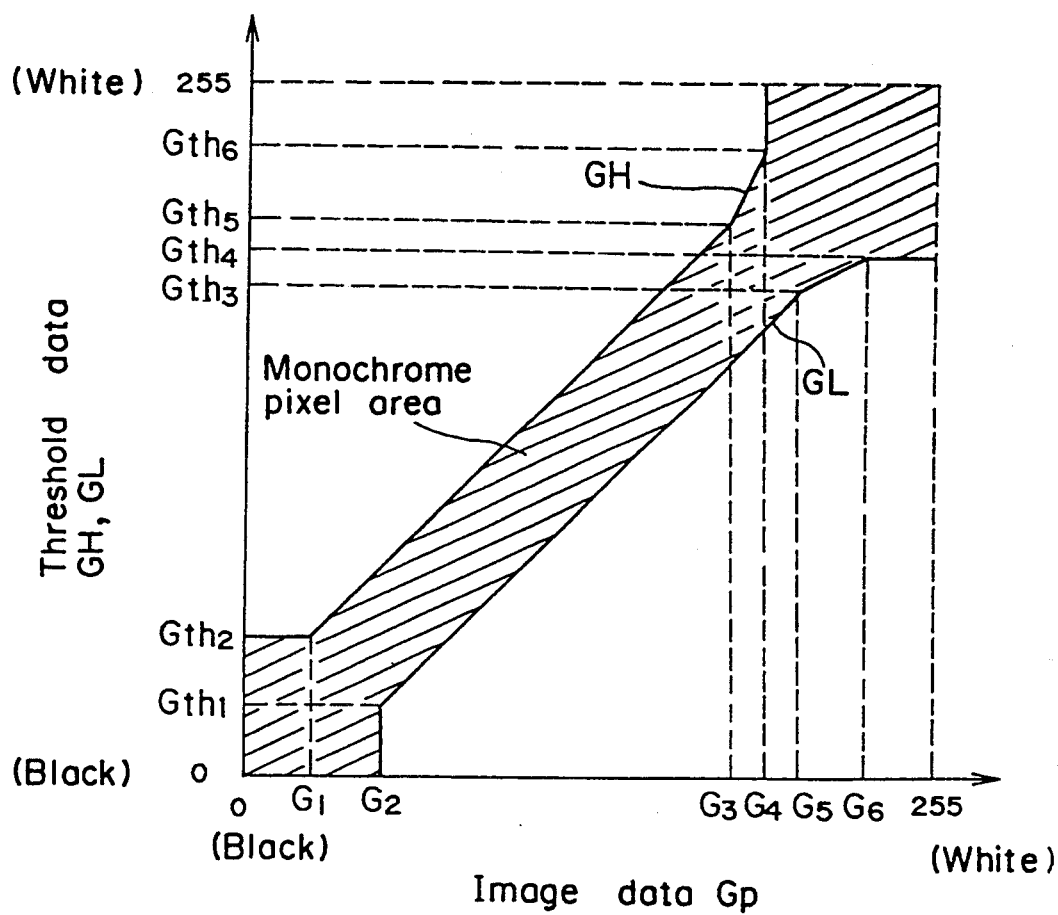
FIG. 10 is a graph showing a relationship between threshold data for judging a monochrome pixel of an image in the monochrome pixel detector shown in FIG. 7 and image data of green.

In the monochrome pixel detector 106 of the present embodiment, as shown in FIG. 10, the upper and lower threshold data GH and GL previously determined based on the green image data Gp inputted from the shading correction circuit 104 are stored in ROMs 321 and 322, respectively. When the red and blue image data Rp and Bp simultaneously satisfy the following relationships (6a) and (6b), the read pixel is judged to be a monochrome pixel of white, black or half-tone black having any half-tone density or gradation.

$$GH \geq Bp \geq GL \qquad (6a)$$

$$GH \geq Rp \geq GL \qquad (6b)$$

The reason why the monochrome pixel detection is made using the green image data Gp as reference data in the present preferred embodiment is as follows. That is, in the CCD image sensor 29 employed in the present preferred embodiment, as shown in FIG. 4b, respective pixels for reading are arranged in line in the main scan direction in the order of red (R), green (G) and blue (B), and in one pixel thereof, the green pixel for reading is arranged in the center of them. Since the complementary color of green is magenta, in the case of printing a full color image using yellow, magenta and cyan toners, the input of green image data to the CCD image sensor 29 correspond to the output of magenta image data. Since a printed magenta image is conspicuous as compared with a cyan or yellow image in the case of printing the magenta image so as to be shifted from a predetermined position to be printed upon printing a color image using cyan, magenta and yellow toner images. Therefore, upon judging the monochrome pixel, in a first method of judging the monochrome pixel by comparing image data Rp of red and image data Bp of blue with image data Gp of green used as reference data which are read by the pixel of green for reading is positioned in the center of each one pixel as described above, an error in the reading position upon reading an edge portion of an image becomes smaller than that in second and third methods respectively using image data Rp and Bp as the reference data.

Figure 12:
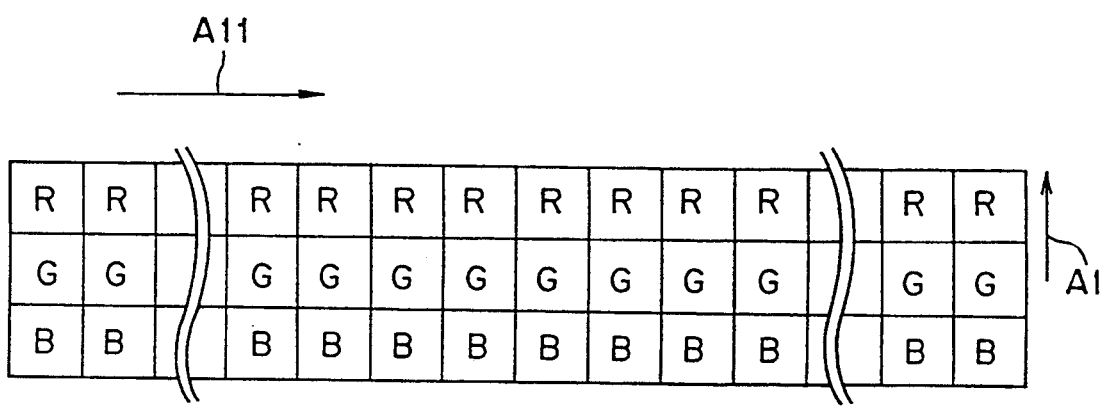
FIG. 12 is a schematic plan view showing a modification of the contact type CCD image sensor shown in FIGS. 4a and 4b.

A CCD image sensor wherein a plurality of reading pixels, each arranged in an order of R, G and B in the subscan scan direction A1, are arranged in the main scan direction A11 as shown in FIG. 12 may be used instead of the CCD image sensor 29 of the present preferred embodiment. Furthermore, although the image data Gp are used as the reference data in the present preferred embodiment, the present invention is not limited to this. The image data Rp or Bp may be used as the reference data for effecting the monochrome pixel judgement.

In the present preferred embodiment, as shown in FIG. 10, the upper threshold data GH is threshold data $Gth_2$ in a range from zero to $G_1$ of the image data Gp, increase with a gradient of one in a range from $G_1$ to $G_3$ of the image data Gp, increase with a gradient of two in a range from $G_3$ to $G_4$ of the image data Gp, and become the largest threshold data 255 in a range from $G_4$ to 255 of the image data Gp. Meanwhile, as shown in FIG. 10, the lower threshold data GL are the smallest threshold data zero in a range from zero to $G_2$ of the image data Gp, increase with a gradient of one in a range from $G_2$ to $G_5$ of the image data Gp, increase with a gradient of $\frac{1}{2}$ in a range from $G_5$ to $G_6$ of the image data Gp, and become threshold data $Gth_4$ in a range from $G_6$ to 255 of the image data Gp. Here, $0 < G_1 < G_2 < G_3 21 G_4 < G_5 < G_6 < 255$, and $0 < Gth_1 < Gth_2 < Gth_3 < Gth_4 < Gth_5 < Gth_6 < 255$. Furthermore, in the present preferred embodiment, preferably, $G_1=8$, $G_2=16$, $G_3=223$, $G_4=231$, $G_5=239$, $G_6=247$, $Gth_1=8$, $Gth_2=32$, $Gth_3=223$, $Gth_4=231$, $Gth_5=239$ and $Gth_6=247$.

In the monochrome pixel detector 106 shown in FIG. 7, the ROM 321 comprises a table of the lower threshold data GL. In response to the eight bits image data Gp of green inputted to address data input terminals A7 to A0 from the shading correction circuit 104, the ROM 321 outputs the lower threshold data GL of 8 bits to respective inverted input terminals of comparators COMP1 and COMP3. On the other hand, the ROM 322 comprises a table of the upper threshold data GH. In response to the eight bits image data Gp of green inputted to address data input terminals A7 to A0 from the shading correction circuit 104, the ROM 322 outputs the upper threshold data GH of 8 bits to respective non-inverted input terminals of comparators COMP2 and COMP4.

Furthermore, the eight bits image data Rp of red outputted from the shading correction circuit 104 are inputted to a non-inverted input terminal of the comparator COMP1 and an inverted input terminal of the comparator COMP2. On the other hand, the eight bits image data Bp of blue outputted from the shading correction circuit 104 are inputted to a non-inverted input terminal of the comparator COMP3 and an inverted input terminal of the comparator COMP4. Further, respective output terminals of the comparators COMP1 to COMP4 are connected to respective input terminals of an AND gate AND.

When data inputted to the non-inverted input terminal are equal to or larger than data inputted to the inverted terminal, each of the comparators COMP1 to COMP4 outputs a comparison result signal of a High level to the input terminal of the AND gate AND. On the other hand, when data inputted to the non-inverted input terminal are smaller than data inputted to the inverted terminal, each of the comparators COMP1 to COMP4 outputs the comparison result signal of a Low level to the input terminal of the AND gate AND. A monochrome pixel detection signal BK outputted from the AND gate AND is inputted to a control terminal of a switch SW1, which is switched over to a terminal a when the monochrome pixel detection signal BK of the Low level is inputted to the control terminal thereof, and also is switched over to a terminal b when the monochrome pixel detection signal BK of the High level is inputted to the control terminal thereof.

A ROM 323 stores UCR/BP coefficient data $(\alpha_1, \beta_1)$ when a pixel of the read image is judged to be a color pixel other than the monochrome pixel. Based on the mode data outputted from the CPU 100 in accordance with the generation color signal as described later and the operation mode specified using the operation panel 120, the ROM 323 outputs data of $\alpha_1=0.25$ as the UCR coefficient data $\alpha$ when a generation color to be reproduced is cyan, magenta or yellow in the full color mode, and also outputs data of $\beta_1=0.44$ as the BP coefficient data $\beta$ when a generation color to be reproduced is black in the full color mode, which are outputted to the color correction circuit 105 through the terminal a of the switch SW1 as the UCR/BP coefficient data $(\alpha, \beta)$.

In the full color mode, the digital full color copying machine of the present preferred embodiment reproduces images of cyan, magenta, yellow and black, sequentially, thereby forming a full color image through superimposition thereof, and the original scanning apparatus 50 scans an original every time when each of images of cyan, magenta, yellow and black is reproduced. Accordingly, a generation color to be reproduced is cyan at the first scan, and then, a generation color to be reproduced is magenta at the second scan. Thus, in order to obtain image data of the specified generation color from image data read by the CCD image sensor 29, the image processing section 30 is controlled by the generation color signal outputted from the CPU 100.

A ROM 324 stores UCR/BP coefficient data $(\alpha_2, \beta_2)$ when a pixel of the read image is judged to be a monochrome pixel. Based on the mode data and generation color signal inputted from CPU 100, the ROM 324 outputs data of $\alpha_2=0.65$ as the UCR coefficient data $\alpha$ when a generation color is cyan, magenta or yellow in the full color mode, and also outputs data of $\beta_2=0.80$ as the BP coefficient data $\beta$ when a generation color to be reproduced is black in the full color mode, which are outputted to the color correction circuit 105 through the terminal b of the switch SW1 as the UCR/BP coefficient data $(\alpha, \beta)$.

When the mono color mode is specified using the operation panel 120, the mode data outputted from the CPU 100 in accordance with the specified mode are inputted to the ROM 323 and the ROM 324 independent of the above-mentioned judgement of the color pixel or the monochrome pixel. In accordance with the mode data, the ROMs 323 and 324 outputs data of $\alpha=\beta=0$ to the color correction circuit 105 as the UCR/BP coefficient data $(\alpha, \beta)$ when a generation color to be reproduced is cyan, magenta, yellow, red, blue or green in the mono color mode, and also outputs data of $\alpha=\beta=1$ to the color correction circuit 105 as the UCR/BP coefficient data $(\alpha, \beta)$ when a generation color to be reproduced is black in the mono color mode.

In the monochrome pixel detector 106 constituted as described above, when all of the comparison result signals outputted from the comparators COMP1 to COMP4 become the High level, that is, when the conditions of the equations (6a) and (6b) are satisfied simultaneously, it is judged that a pixel of the read image is the monochrome pixel, and then, the AND gate AND outputs the monochrome pixel detection signal BK of the High level to the control signal of the switch SW1 so that the switch SW1 is switched over to the terminal b. At that time, the UCR/BP coefficient data $(\alpha_2, \beta_2)$ are outputted from the ROM 324 to the color correction circuit 105 as the UCR/BP coefficient data $(\alpha, \beta)$.

On the other hand, when at least one of the comparison result signals outputted from the respective comparators COMP1 to COMP4 becomes the Low level, that is, when any of the conditions of the equations (6a) and (6b) is not satisfied, it is judged that a pixel of the read image is a color pixel other than the monochrome pixel, and then, the AND gate AND outputs the monochrome pixel detection signal BK of the Low level to the control terminal of the switch SW1 so that the switch SW1 is switched over to the terminal a. At that time, the UCR/BP coefficient data $(\alpha_1, \beta_1)$ are outputted from the ROM 323 to the color correction circuit 105 as the UCR/BP coefficient data $(\alpha, \beta)$.

According to experiments performed by the inventors of the present invention, the UCR/BP coefficient data $(\alpha_1, \beta_1)$ and $(\alpha_2, \beta_2)$ are preferably selected in the following ranges.

$13\% \leq \alpha_1 \leq 38\%$
$38\% \leq \beta_1 \leq 50\%$
$50\% \leq \alpha_2 \leq 75\%$
$75\% \leq \beta_2 \leq 100\%$ Since the monochrome pixel detector 106 is constituted by the two ROMs 321 and 322, each having relatively small capacity, the four comparators COMP1 to COMP4 and the AND gate AND, the monochrome pixel detector 106 can judge whether each pixel of the read image is a monochrome pixel or a color pixel in an improved speed higher than that of a conventional monochrome detector comprising one ROM having relatively large capacity, which judges whether each pixel of the read image is a monochrome pixel or a color pixel in accordance with address data of image data of three colors R, G and B.

Figure 8:
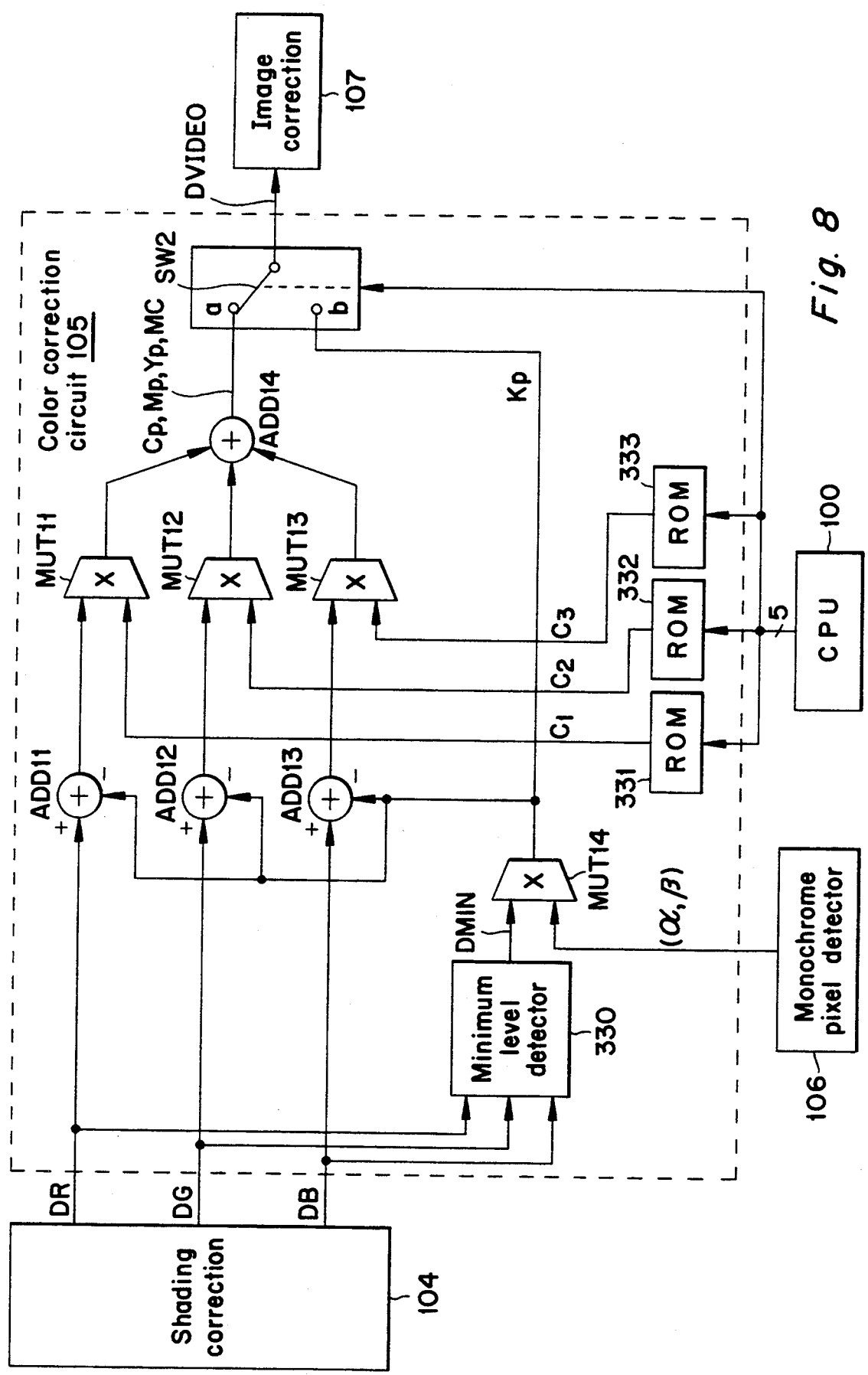

FIG. 8 shows the color correction circuit 105 shown in FIG. 1a.

The color correction circuit 105 performs a color correction by a subtractive primaries method using the image data Yp, Mp and Cp of yellow Y, magenta M and cyan C and a black adding method using the image data Kp of black K, and sequentially reproduces each of the image data Yp, Mp, Cp and Kp every one scan in an order of images of cyan C→magenta M→yellow Y→black K, namely, reproduces the image data required for forming a full color image by the four scans.

In the color correction circuit 105, there are performed an under color removal and black adding process, a masking process, and a process for reproducing monochromatic image data MC to be performed in the mono color mode, and the above respective processes will be described below.

(a) Under color removal and black adding process

Figure 11:
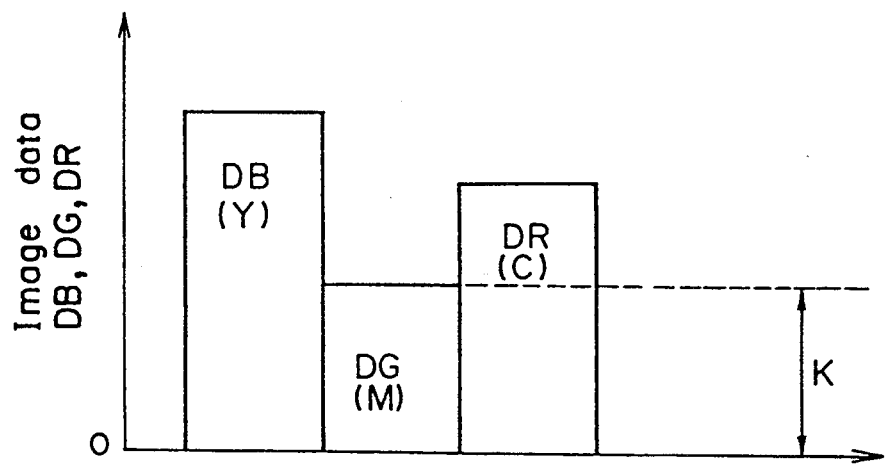
FIG. 11 is a graph showing a method for generating image data of black in the color correction circuit shown in FIG. 8.

Since the image data DR, DG and DB after completion of the density conversion process are image data for representing respective densities of R, G and B color components of the original image, they respectively correspond to respective complementary colors cyan C, magenta M and yellow Y of red R, green G and blue B in the CCD image sensor 29. Accordingly, since the minimum value of these image data DR, DG and DB is considered to be a component obtained by superimposing respective color components of cyan C, magenta M and yellow Y of the original image. Therefore, as shown in FIG. 11, the minimum value DMIN=min (DR, DG, DB) of the image data DR, DG and DB can be made black image data K. However, even if a black image is reproduced by superimposing respective images of image data Yp, Mp and Cp of three colors Y, M and C, it is difficult to clearly reproduce a black image due to effects of spectral characteristics of the respective color toners.

Accordingly, in the present preferred embodiment, the minimum value DMIN=min (DR, DG, DB) of the image data DR, DG and DB of each pixel is detected. Then, upon generating the image data Cp, Mp and Yp, the under color removal process is performed by respectively subtracting an under color removal amount $\alpha$·min (DR, DG, DB) from the image data DR, DG and DB. On the other hand, upon generating the image data Kp of black K, the black adding process is performed by outputting a black adding amount $\beta$·min (DR, DG, DB) as the image data Kp, thereby improving a reproductivity of the black image.

(b) Masking process

The masking process is performed in order to correct filtering characteristics of the respective optical filters R, G and B of the CCD image sensor 29 and also to correct reflection characteristics of the respective toners Y, M and C of the developing unit 20 of the full color printer section 2, thereby improving a color reproductivity.

(c) Process of generating monochromatic image data MC

In the mono color mode of the present preferred embodiment, there is generated monochromatic image data MC having density information obtained based on a spectral luminous efficiency of human eyes, and a monochromatic image or one color image of a color is formed using toners of C, M, Y and K. As known to those skilled in the art, a red image is reproduced by respectively developing the same images as each other using toners of magenta M and yellow Y and superimposing them, a green image is reproduced by respectively developing the same images as each other using toners of cyan C and yellow Y and superimposing them, and a blue image is reproduced by respectively developing the same image as each other using toners of cyan C and magenta M and superimposing them. It is to be noted that the above-mentioned under color removal process is not performed upon generating the monochromatic image data MC.

A composition of the color correction circuit 105 shown in FIG. 8 will be described below.

Referring to FIG. 8, the image data DR, DG and DB after completion of the density conversion process outputted from the shading correction circuit 104 are respectively inputted to adders ADD11, ADD12 and ADD13 and a minimum level detector 330. The minimum level detector 330 detects the minimum image data DMIN=min (DR, DG, DB) of the inputted image data DR, DG and DB, and outputs the detected minimum image data DMIN to a multiplier MUT14. The UCR/BP coefficient data $(\alpha, \beta)$ outputted from the monochrome pixel detector 106 are inputted to the multiplier MUT14. The multiplier MUT14 multiplies the inputted two data, and then, outputs data of the multiplication result to the three adders ADD11, ADD12 and ADD13 and a terminal b of a switch SW2.

The adder ADD11 subtracts data outputted from the multiplier MUT14 from the image data DR, and then, outputs data of the subtraction result to a multiplier MUT11. Further, the adder ADD12 subtracts data outputted from the multiplier MUT14 from the image data DG, and then, outputs data of the subtraction result to a multiplier MUT12. Furthermore, the adder ADD13 subtracts data outputted from the multiplier MUT14 from the image data DB, and then, outputs data of the subtraction result to a multiplier MUT13.

A ROM 331 stores masking coefficient data $C_1 = Ac$, Bc, Cc and Ecx (x=c, m, y, r, g, b), and outputs to the multiplier MUT11 one of the masking coefficient data $C_1$ selected in accordance with the generation color signal and the mode data inputted as address data from the CPU 100, as shown in Tables 1 and 2. Further, a ROM 332 stores masking coefficient data $C_2 = Am$, Bm, Cm and Emx (x=c, m, y, r, g, b), and outputs to the multiplier MUT12 one of the masking coefficient data $C_2$ selected in accordance with the generation color signal and the mode data inputted as address data from the CPU 100, as shown in Tables 1 and 2. A ROM 333 stores masking coefficient data $C_3 = Ay$, By, Cy and Eyx (x=c, m, y, r, g, b), and outputs to the multiplier MUT13 one of the masking coefficient data $C_3$ selected in accordance with the generation color signal and the mode data inputted as address data from the CPU 100, as shown in Tables 1 and 2.

Each of the multipliers MUT11, MUT12 and MUT13 multiplies the inputted two data, and then, outputs data of the multiplication result to an adder ADD14. The adder ADD14 adds the three data outputted from the respective multipliers MUT11, MUT12 and MUT13, and then, outputs data of the addition result to the image correction circuit 107 as the digital printer driving signal DVIDEO through a terminal a of the switch SW2. It is to be noted that the generation color signal and the mode data outputted from CPU 100 are inputted to a control terminal of the switch SW2.

When a generation color to be reproduced is cyan, magenta or yellow in the full color mode, namely, at least one of the two bits generation color signal becomes the Low level, or when a specified color to be reproduced is blue, red, green, cyan, magenta or yellow in the mono color mode, namely, at least one of the three bits mode data becomes the Low level, the switch SW2 is switched over to the terminal a. On the other hand, when a generation color to be reproduced is black, namely, both the two bits of the generation color signal become the High level, or when the black color is specified in the mono color mode, namely, all the three bits of the mode data become the High level, the switch SW2 is switched over to the terminal b.

In the color correction circuit 105 constituted as described above, in the full color mode, the image data Cp, Mp and Yp represented by the following equation (7) are generated, and then, they are outputted as the digital printer driving signal DVIDEO from the output terminal of the adder ADD14 through the terminal a of the switch SW2 to the color correction circuit 107. On the other hand, the image data Kp represented by the following equation (8) is generated, and then, they are outputted as the digital printer driving signal DVIDEO from the output terminal of the multiplier MUT14 through the terminal b of the switch SW2 to the image correction circuit 107.

Namely, in the full color mode or when the black color is specified in the mono color mode, the image data Cp, Mp, Yp and Kp are obtained by the following equations:

$$\begin{bmatrix} Cp \\ Mp \\ Yp \end{bmatrix} = \begin{bmatrix} Ac & Am & Ay \\ Bc & Bm & By \\ Cc & Cm & Cy \end{bmatrix} \cdot \begin{bmatrix} DR - \alpha \cdot DMIN \\ DG - \alpha \cdot DMIN \\ DB - \alpha \cdot DMIN \end{bmatrix}, \quad (7)$$

$$Kp = \beta \cdot DMIN \quad (8),$$

where $DMIN = \min(DR, DG, DB)$ (9).

Furthermore, in the mono color mode except for a time when the black color is specified, data of zero are inputted as the UCR/BP coefficient data ($\alpha$, $\beta$) from the monochrome pixel detector 106 to the multiplier MUT14. At that time, data of zero are outputted from the multiplier MUT14 to the adders ADD11, ADD12 and ADD13, and then, monochromatic image data MC represented by the following equation (10) are generated by the adder ADD14, and are outputted through the terminal a of the switch SW2 to the image correction circuit 107 as the digital printer driving signal DVIDEO.

$$MC = Ecx \cdot DR + Emx \cdot DG + Eyx \cdot DB \quad (10)$$

where x=c, m, y, r, g, b.

As is clear from the foregoing description, according to the present preferred embodiment, in the processes for generating the above-mentioned image data and judging the monochrome pixel, a number of bits to be processed becomes smaller than that of the conventional apparatus for judging the monochrome pixel using a ROM having a relatively large memory capacity. Therefore, a manufacturing cost of the electric circuit for generating the -above-mentioned image data and judging the monochrome pixel can be lowered, and the process for judging the monochrome pixel can be performed in a speed higher than that of the conventional apparatus.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| Operation mode | Specified generation color | Generation color signal (GC signal) | Mode data |
|---|---|---|---|
| Full color mode | Cyan C | 0 0 | 0 0 0 |
|  | Magenta M | 0 1 |  |
|  | Yelllow Y | 1 0 |  |
|  | Black K | 1 1 |  |
| Mono color mode | Cyan C | 0 0 | 0 0 1 |
|  | Magenta M | 0 1 | 0 1 0 |
|  | Yellow Y | 1 0 | 0 1 1 |
|  | Red R | 0 1 → 1 0 | 1 0 0 |
|  | Green G | 0 0 → 1 0 | 1 0 1 |
|  | Blue B | 0 0 → 0 1 | 1 1 0 |
|  | Black K | 1 1 | 1 1 1 |

TABLE 2

| Operation mode | Specified generation color | Masking coefficient data | UCR/BP coefficient data |
|---|---|---|---|
| Full color | Cyan C | Ac, Am, Ay | $\alpha$ |

TABLE 2-continued

| Operation mode | Specified generation color | Masking coefficient data | UCR/BP coefficient data |
|---|---|---|---|
| mode | Magenta M | Bc, Bm, By | $\alpha$ |
|  | Yellow Y | Cc, Cm, Cy | $\alpha$ |
|  | Black K | — | $\beta$ |
| Mono color mode | Cyan C | Ecc, Emc, Eyc | 0 |
|  | Magenta M | Ecm, Emm, Eym | 0 |
|  | Yellow Y | Ecy, Emy, Eyy | 0 |
|  | Red R | Ecr, Emr, Eyr | 0 |
|  | Green G | Ecg, Emg, Eyg | 0 |
|  | Blue B | Ecb, Emb, Eyb | 0 |
|  | Black K | — | 1 |

What is claimed is:

1. A color image data processing apparatus for processing three color image data of three primary colors for representing a specified pixel, comprising:
generation means in response to one color image data preselected among said three color image data for generating threshold data for representing upper and lower limits of respective ranges in which two color image data other than said preselected one color image data are to be present when said specified pixel is a monochrome pixel of white, black or half-tone black; and
judgement means for comparing said other two color image data with said threshold data generated by said generation means, and judging that said specified pixel is said monochrome pixel when both of said other two color image data are respectively fallen in said respective ranges from said upper limit to said lower limit.

2. The apparatus as claimed in claim 1,
wherein said three color image data of the three primary colors are color image data of red, green and blue.

3. The apparatus as claimed in claim 2,
wherein said preselected one color image data is color image data of green.

4. The apparatus as claimed in claim 1, further comprising processing means for performing a color correction process for said three color image data of the three primary colors in response to a judgement result of said judgement means.

5. A color image data processing apparatus converting three input data of red, green and blue of a specified pixel into four output data of cyan, magenta, yellow and black, comprising:
generation means in response to one input data preselected among said three input data for generating threshold data for representing upper and lower limits of respective ranges in which two input data other than said preselected one input data are to be present when said specified Fixel is a monochrome pixel of white, black or half-tone black;
judgement means for comparing said other two input data with said threshold data generated by said generation means, and judging that said specified pixel is said monochrome pixel when both of said other two input data are respectively fallen in said respective ranges from said upper limit to said lower limit; and
conversion means in response to a judgement result of said judgement means for converting said three input data of red, green and blue of said specified pixel into four output data of cyan, magenta, yellow and black.

6. The apparatus as claimed in claim 5,
wherein said preselected one input data is input data of green.

7. The apparatus as claimed in claim 5,
wherein said conversion means determines an under color removal amount and a black adding amount which are used upon converting said three input data of red, green and blue of said specified pixel into four output data of cyan, magenta, yellow and black, in response to a judgement result of said judgement means.

8. A color image data processing apparatus for converting color image data of red, green and blue of a specified pixel into color image data of cyan, magenta, yellow and black, comprising:
judgement means in response to said color image data of red, green and blue for judging whether or not said specified pixel is a monochrome pixel of white, black or half-tone black; and
conversion means in response to a judgement result of said judgement means for determining an under color removal amount and a black adding amount and converting said color image data of red, green and blue of said specified pixel into color image data of cyan, magenta, yellow and black with said determined under color removal amount and said determined black adding amount,
wherein said judgement means generates under color removal coefficient data $\alpha$ and black adding coefficient data $\beta$ in response to said judgement result of said judgement means and outputs them to said conversion means, and
said conversion means detects minimum data DMIN among said color image data of red, green and blue, generates said color image data of cyan, magenta and yellow by respectively subtracting a product of said under color removal coefficient data $\alpha$ and said detected minimum data DMIN from said color image data of red, green and blue, and generates said color image data of black by multiplying said black adding coefficient data $\beta$ by said detected minimum data DMIN.

9. The apparatus as claimed in claim 8,
wherein said under color removal coefficient data $\alpha$ and said black adding coefficient data $\beta$ satisfy the following conditions when it is judged by said judgement means that said specified pixel is said monochrome pixel:
$50\% \leq \alpha \leq 75\%$, and
$75\% \leq \beta \leq 100\%$.

10. The apparatus as claimed in claim 8,
wherein said under color removal coefficient data $\alpha$ and said black adding coefficient data $\beta$ satisfy the following conditions when it is judged by said judgement means that said specified pixel is not said monochrome pixel:
$13\% \leq \alpha \leq 38\%$, and
$38\% \leq \beta \leq 50\%$.

11. A method for processing three color image data of three primary colors for representing densities of the three primary colors of a specified pixel, including the following steps of:
generating, in response to one color image data preselected among said three color image data, threshold data for representing upper and lower limits of respective ranges in which two color image data other than said preselected one color image data are to be present when said specified pixel is a monochrome pixel of white, black or half-tone black;

comparing said other two color image data with said generated threshold data; and judging that said specified pixel is said monochrome pixel when both of said other two color image data are respectively fallen in said respective ranges from said upper limit to said lower limit.

* * * * *